May 8, 1962 R. HELL ET AL 3,034,105

METHOD OF AND APPARATUS FOR PRODUCING EXTENDED IMPULSE COMBINATION SEQUENCES OF EXTREMELY LONG PERIOD FOR USE IN CODING MACHINES

Filed March 9, 1959 3 Sheets-Sheet 1

May 8, 1962 R. HELL ET AL 3,034,105
METHOD OF AND APPARATUS FOR PRODUCING EXTENDED IMPULSE COMBINATION SEQUENCES OF EXTREMELY LONG PERIOD FOR USE IN CODING MACHINES
Filed March 9, 1959 3 Sheets-Sheet 2
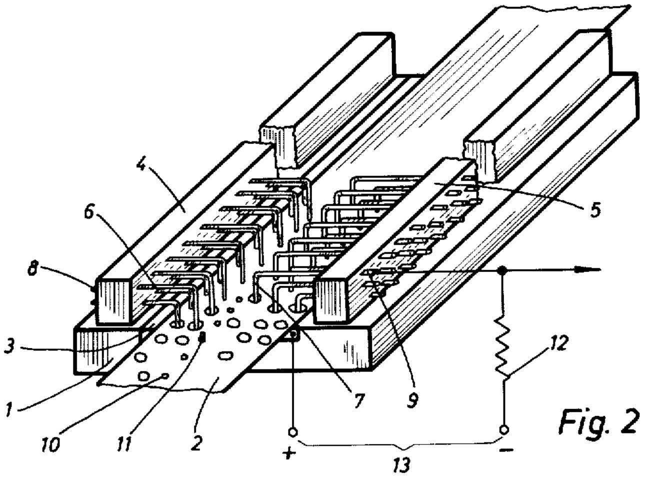
Fig. 2
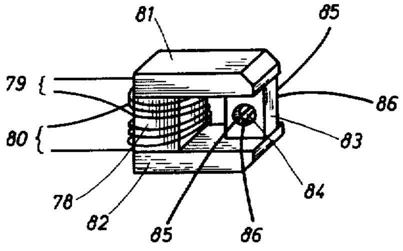
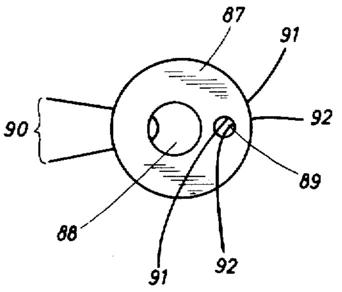
Fig. 4
Fig. 5

METHOD OF AND APPARATUS FOR PRODUCING EXTENDED IMPULSE COMBINATION SEQUENCES OF EXTREMELY LONG PERIOD FOR USE IN CODING MACHINES

Filed March 9, 1959

3 Sheets-Sheet 3

United States Patent Office 3,034,105
Patented May 8, 1962

3,034,105

METHOD OF AND APPARATUS FOR PRODUCING EXTENDED IMPULSE COMBINATION SEQUENCES OF EXTREMELY LONG PERIOD FOR USE IN CODING MACHINES

Rudolf Hell, Kiel, and Roman Koll, Kiel-Wellingdorf, Germany, assignors to Dr.-Ing. Rudolf Hell Kommanditgesellschaft, Kiel, Germany, a German company Filed Mar. 9, 1959, Ser. No. 798,293
Claims priority, application Germany Mar. 8, 1958
5 Claims. (Cl. 340—172.5)

This invention is concerned with a method of and apparatus for producing in binary teleprinter code extended punched coding tapes of very long period, for use in coding machines.

Some of the important terms which will be used herein shall first be defined to facilitate understanding.

The term symbol element is commonly used in the telegraph and teleprinter arts, referring to the element of a symbol that can be represented by + and — or 1 and 0 or hole and no hole. In operation with punched tape, binary symbol elements are represented by hole and no hole (absence of hole).

A symbol element sequence consists of successive symbol elements regardless of using, for example, the 5-element or the 7-element teleprinter code. In the case of punched tape operation, the symbol element sequence is a sequence of hole and no hole disposed in parallel to the longitudinal extent of the punched tape, the 5-element code tape thereby having five symbol element sequences.

The term symbol element combination designates, depending upon the code used, a combination of 3, 5 or 7 symbol elements. For example, in the case of a punched tape for the 5-element code, a symbol element combination is a combination of 5 elements (hole and no hole) disposed perpendicular to the longitudinal extent of the tape or transverse thereof.

The designation sequence of symbol element combinations means a succession of symbol element combinations extending one after the other in the longitudinal direction of the punched tape. For example, any punched tape for the 5-element or the 7-element teleprinter code can be designated as having a sequence of symbol element combinations.

A coding tape is said to be periodic when it carries transversely extending sequences of binary symbol element combinations (for example, punched 5-element groups), which are periodically repeated. The number of the symbol element combinations in such sequence is referred to as the period of the coding tape.

Coding methods are known wherein binary symbol elements of an aperiodic coding tape, produced individually, following no law and with senseless and arbitrary distribution of the code groups are multiplicatively superimposed upon the binary symbol elements of clear text tapes carrying the message to be coded, for example, in the form of punched 5-element or 7-element groups. The individual 5-element groups of both tapes are simultaneously scanned along mutually corresponding places and the signs of the corresponding punched symbol elements (for example, hole=plus; no hole=minus) are electrically multiplied according to the algebraic sign rules, such that $+\cdot+=+$; $-\cdot-=+$; $+\cdot-=-$; $-\cdot+=-$. While this method is dependable from the standpoint of coding technique, it has the organizational and technical disadvantage that the aperiodic coding tape must be as long as the clear text tape and can be used only once. The present invention may be considered as an improvement on the invention disclosed in copending application Serial No. 543,549, now U.S. Pat. No. 2,949,501, filed October 28, 1955.

The copending application Serial No. 543,549 describes apparatus for effecting transverse reading of symbol element combinations, in the production of extended coding tapes, comprising rotatable disks functioning as storers, ferromagnetic coatings being provided peripherally of the disks for magnetically storing the symbol element sequences, the disks rotating at different speeds acting in the manner of aliquant numbers but so that all disks simultaneously execute a symbol element step.

Another prior structure proposes simplified apparatus for effecting the transverse reading, comprising a drive motor, a reduction gear, a shaft driven by the reduction gear and carrying *n* sprocket wheels having the same diameter and the same number of sprocket teeth, such teeth engaging into transport perforations provided centrally of endless bands which are respectively formed of a plurality of punched coding tapes joined by gluing or suitable cementing; further comprising *n* groups each with *n* photoelectrical or electromechanical scanning devices disposed in a row in parallel to and in front of the sprocket shaft, only one scanning device in each group being at any time operatively connected for simultaneously scanning from the *n* punched tapes *n* longitudinal hole sequences which are in this manner combined.

The common feature of the apparatus according to the two above noted prior structures, for producing extended punched coding tapes by gradual shifting of the individual symbol element sequences each with respect to the others, resides in the utilization of electromechanically operating devices comprising rotatable parts. This limits the speed of producing the extended punched coding tape, which is for some coding purposes insufficient, for example, when it is intended to produce, instead of extended punched tapes, extended sequences of impulse combinations to be used directly for coding, that is, without first producing an extended punched tape. Moreover, wear of the parts that may cause operation disturbances occurs gradually in the case of magnetic as well as optical scanning of mechanically moving storers including magnetic disks, magnetic tape and punched paper tape.

The present invention proposes to produce symbol combination sequences of extremely long period, in a binary code, for coding machines, by the use of a relatively short, aperiodic, arbitrarily chosen sequence of symbol element combinations, whereby the symbol element sequences respectively formed from the 1st, 2nd, 3rd, etc. symbol elements (for example, + and — or 1 and 0 or hole and no-hole) contain symbol element numbers no two of which have a common divisor, and avoids the use of mechanically moving parts by storing the binary symbol elements of the symbol element sequences in storage elements which allow as frequent reading as desired but retain the binary information stored therein, and electronically simultaneously and periodically reading with the same stepping speed the storage element sequences corresponding to the symbol element sequences from a desired selectable and agreed upon mutual start position.

The apparatus according to the invention comprises a plurality of storage elements (for example, switches, relays, flip-flop stages, magnetic ring cores) in number corresponding to the total number of the binary symbol elements of the symbol element sequences, said storage elements being arranged in different storage sequences corresponding to the different symbol element sequences, the individual storage elements being respectively set in accordance with one of the two binary positions thereof corresponding to the binary signal element respectively allotted thereto; further comprising an impulse generator serving as a timer, the frequency of said timer determining the scanning speed of the storage elements, an electronic counter for each storage element sequence for periodically counting the impulses of the impulse generator up to a number which is equal to the number of storage elements of the corresponding storage element sequence, an indicating or signal device for each counter having a number of outputs which is equal to the number of the storage elements of the respective storage element sequence, potential changes successively occurring impulse-wise at said outputs, a setting device for each counter by which the counter may be set to a desired counting result within its counting period; and comprising moreover a number of reading devices which is equal to the number of storage elements of each storage sequence, each reading device being on its input side connected with a storage element of the storage element sequence and the corresponding output being connected with the signal or indicating device belonging to the storage sequence, the outputs of said reading devices being for each storage element sequence respectively connected with a common output line at which will incident to continuous reading successively appear the impulse combinations of the extended impulse combination sequence in the rhythm of the impulse generator.

The scanning of the storage element sequences is accordingly effected purely electronically without the use of mechanically moving parts, thereby avoiding the previously mentioned disadvantages residing in limited speed of production of the impulse combinations and the wear of parts.

The various objects and features of the invention will appear in the course of the description of an embodiment thereof which is rendered below with reference to the accompanying drawings, FIGS. 1–5.

FIG. 2 represents a stationary electrical storer using a punched tape;

FIG. 4 illustrates a storage ring core which retains its stored informations, allowing reading as often as desired; and FIG. 5 shows a transfluxor exhibiting the same properties as the ring core.

To aid the understanding of FIG. 1, it shall be assumed that the short symbol element combination sequence which is to be extended, is present in a binary five-element code, for example, in the form of plus-minus combinations noted one below the other upon a paper sheet or in the form of a correspondingly punched tape (for example, $+=$hole; $-=$no hole). It shall further be assumed that the five symbol element sequences formed respectively from the 1st, 2nd, 3rd, 4th and 5th symbol elements and lying perpendicularly to the combinations, are of different length and exhibit numbers of symbol elements no two of which have a common divisor, for example, about numbers such as $m_1=197$, $m_2=199$, $m_3=200$, $m_4=201$, $m_5=203$. The period of the symbol element sequence system is equal to the product of the periods of the individual symbol element sequences and amounts to $$m_1 \cdot m_2 \cdot m_3 \cdot m_4 \cdot m_5 \approx 200^5$$

Figure 1:
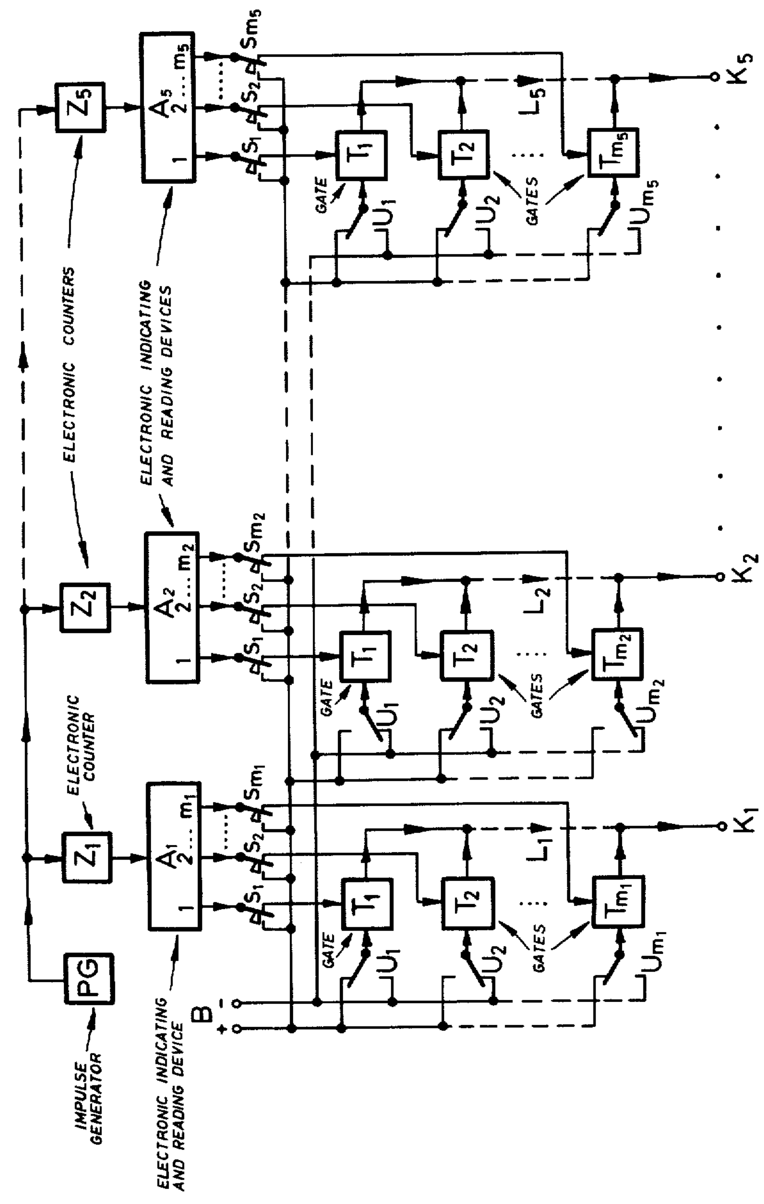
FIG. 1 shows in block diagram manner the basic circuit arrangement using switches or relays as storage elements.

In FIG. 1, PG is an impulse generator the impulses of which are periodically counted by electronic counters $Z_1 \ldots Z_5$ which are connected in parallel thereto. These counters which may, for example, consist of counting tubes or flip-flop circuits are set so that they respectively count up to $m_1$st . . . $m_5$th impulse whereupon they begin to count anew at the $(m_1+1)$st . . . $(m_5+1)$th impulse, such counting continuing for the duration of the operation of the system. References $A_1, A_2 \ldots A_5$ indicate electronic indicating and reading devices, there being five such devices, three of which are shown, which are respectively connected with the corresponding counters and which consist, for example, of diode matrices in case the counters $Z_1 \ldots Z_5$ are binary counters. Each of the reading devices has $m_1 \ldots m_5$ outputs, the numbers of outputs being equal to the counting periods of the respectively corresponding counters. Incident to the counting of the impulses, potential alterations will successively appear at the individual outputs of an indicating device. The outputs extend by way of manually controlled switches $S_1 \ldots S_m$ to the inputs of a corresponding number of electronic gates $T_1 \ldots T_n$. The switches S constitute setting devices for the counters Z. When one of these switches is briefly switched into its left hand position, a pulse is given from the current source B to the corresponding output of the indicating device. The consequence is that the counter is set to the count-number allotted to the corresponding outlet. For example, if the $m$th output is energized, the counter will be placed in the position which it would have assumed if it had counted to the $m$th impulse. When a first impulse is now extended to the counter, the indicating device will register this impulse as $m+1$, a potential variation appearing briefly at its $(m+1)$th output.

Allotted to each counter Z and indicating device A cooperatively associated therewith are switches $U_1 \ldots U_{m_1}$ indicated in corresponding vertical columns, the contacts of these switches being connected to the common current source B. These switches U together with the current source B constitute binary electromechanical storage elements for electromechanically storing the symbol elements of the symbol element sequences which are to be stored. This is effected by manually actuating the switches U upwardly and downwardly or vice versa, according to the symbol elements + and − or hole and no-hole of the noted symbol element sequences, whereby the second inputs of the gates $T_1 \ldots T_{m_2}$ respectively connected to the switches will respectively assume positive and negative potential. The symbol elements of the remaining symbol element sequences are correspondingly stored in the remaining storage element sequences. The storing of the symbol elements of the symbol element sequences is therewith concluded. The outputs of the individual indicating devices A are numbered from 1 through to $m$ in accordance with the respective numbers thereof. Customary relays connected in holding circuits or polarized relays, adapted to be set by key controls, may be employed in place of the switches U.

The scanning of the storage element sequences is effected in the following manner:

The counters Z continuously and periodically count the impulses supplied by the impulse generator PG, up to the number of storage elements provided per storage element sequence. The potential changes occurring with each counting impulse at the corresponding outputs of the indicating devices A open the gates T respectively cooperating therewith and release the respective plus- or minus voltages set by the positions of the switches U, impulse-wise to the common output lines $L_1 \ldots L_5$, the changing impulse combinations appearing at the terminals $K_1 \ldots K_5$ where they are taken off. Owing to the different number of storage elements of the individual storage element sequences, a mutual shifting of the individual storage element sequences will occur responsive to each scanning of the sequences, giving rise to changing impulse combinations of the 32 possible combinations. In the course of operation, each storage element of a sequence is scanned once simultaneously with each storage element of the remaining sequences, and the scanning results appear as transverse combinations at the terminals $K_1 \ldots K_2$; the period of the impulse combinations is equal to the product of the individual periods of the storage element sequences due to the aliquant nature of the numbers of storage elements of the individual storage element sequences. This means that, when the scanning proceeds from a predetermined initial start position of the storage elements of the storage sequences, this start position will for the first time recur only after a number of counting steps which is equal to the product of the storage element numbers of the storage element sequences. Since the counters Z can be set prior to the counting thereof, to a desired counting result within their counting ranges, it is possible to proceed with the scanning from a desired initial start position of the storage elements of the storage element sequences. For example, if it is desired to start from an initial position represented respectively by the $n_1$th, $n_2$th, $n_3$th, $n_4$th, $n_5$th storage element of the five storage element sequences, the corresponding counters must be set to $n_1-1$, $n_2-2$, $n_3-3$, $n_4-1$, $n_5-1$.

If the notation of the short symbol element combination sequence which is to be extended is present in the form of a punched tape, the storing can be effected by means of the device according to FIG. 2, instead of by means of manually actuated switches or relays, such device constituting a further storage arrangement.

Referring to FIG. 2, numeral 1 designates a plate made of non-conducting material corresponding in length to the punched tape 2, in which is embedded a thin conductive metal plate 3 corresponding in width to the width of the punched tape. Numerals 4 and 5 indicate two removably disposed bar-like frames of insulating material in which are fastened L-shaped feeler springs 6, 7, the opposite ends of these springs forming soldering tabs projecting from the frames. The punched tape 2 is placed upon the metal plate 3 and is fixed in a certain longitudinal position proper for the feeler operation, by pins 11 arranged upon the metal plate 3 which engage into the transport perforations 10. For each five-element transversely extending symbol element combination, there are provided five feeler levers respectively indicated at 6 and 7, two of which are carried by the left hand frame 4 and three of which are carried by the right hand frame 5. When the feeler levers encounter holes in the punched tape, they project therethrough and make contact with the metal plate 3. At all other places, contact engagement of the feeler levers with the metal plate is prevented by the intervening paper tape. The metal plate 3 is connected with the positive pole of a current source 13 and each soldering tab 8 and 9 is connected with the negative pole of the current source 13 by way of a resistor 12. All soldering tabs are connected with the corresponding left hand inputs of the gates T shown in FIG. 1. Responsive to contact engagement, current will flow from the positive pole by way of the metal plate to the negative pole of the current source 13. At the soldering tab 9 will then be positive potential. Negative potential will be at 9 if there is no contact engagement established due to the intervening paper between a feeler lever and the metal plate. The system of the feeler levers together with the metal plate accordingly completely substitutes for the switches U.

In place of the feeler lever arrangement shown in FIG. 2, there may be provided with equal effect a pin frame with equally long resilient pins, which is placed with slight pressure with the pins facing downwardly upon the punched tape disposed on the metal plate, the individual pins establishing or not establishing contact engagement with the metal plate depending upon whether they are or are not in alignment with a hole in the punched tape.

Figure 3:
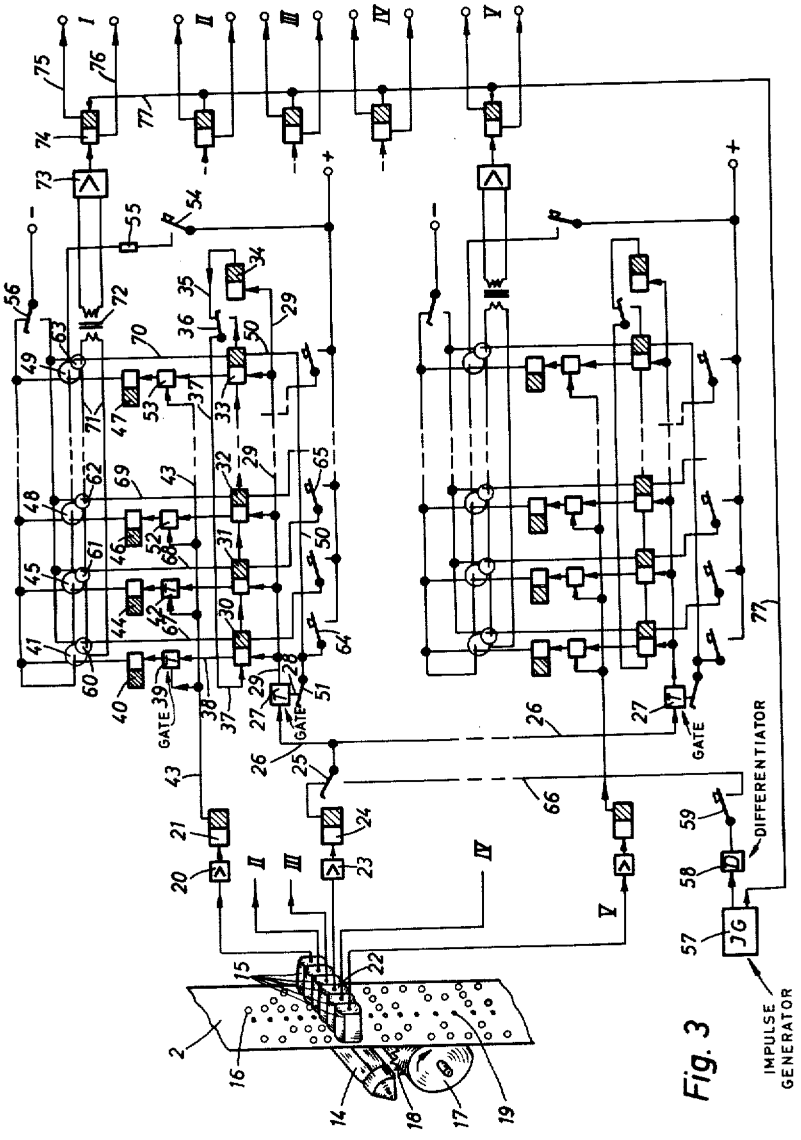
FIG. 3 shows in block diagram manner the circuit of a storing and scanning device using a punched tape and magnetic ring cores as storage elements.

FIG. 3 represents in block diagram manner a further embodiment for the storing of the binary informations of a punched tape in electronic storage elements in the form of magnetic storage ring cores which retain the information stored therein allowing reading thereof as often as desired, and for the periodic electronic scanning of these storage elements. The operations are to be considered in accordance with two aspects, namely, first, the storing of the punched tape informations upon the storage ring cores and, second, the scanning of the storage ring cores.

(1) *The Storing*

Between the filament lamp 14 which is disposed transverse of the punched tape 2 and closely in front thereof, and the five photocells or photo diodes 15, disposed opposite the filament of 14, is guided the short punched tape 2 which is to be extended, such tape containing arbitrarily chosen hole combinations 16 in the five-element code. The punched tape 2 is transported by a sprocket drum 17 having teeth 18 which engage into transport holes 19 formed centrally of the punched tape 2. Whenever a hole of the hole combination permits during the motion of the punched tape with respect to lamp 14 passage of the light, a photo current will be produced in the oppositely positioned photo diode 15 illuminated thereby. Of the six photo diodes, the diodes indicated by numeral 15 will act each by way of an amplifier 20 and an electronic switch 21 on five similar switching arrangements which will hereafter be referred to as storage channels. In view of the similarity of these channels, it will suffice to describe only one.

The photo diode 22 is in a separate position, being aligned with the track of the transport perforations 19 of the punched tape 2 and producing a current impulse incident to each transport step. These impulses are extended over an amplifier 23 to the electronic switch 24 which assumes for a brief interval working position responsive to each impulse. From the switching over of the switch 24 is obtained an impulse which is extended over the mechanical switch 25 and the line 26 to the electronic gates 27 lying at the input of each channel.

It shall be assumed that the gate 27 of a channel, which is an "And" gate, is open, that is, that there is no voltage on line 28. The impulse accordingly can pass through the gate and reaches the collective line 29. This line is the control line for an electronic counting chain comprising the bistable flip-flop switches 30, 31, 32, etc. through to 33 and 34. The output of each switch is connected with the input of the next successive switch. In this switching chain, known as such, any given flip-flop switch consisting of a directional diode amplifier pair (double triode or transistor pair) may initially be in the preference position "In" while all others are in the position "Out." A blocking impulse on the common control line 29 blocks the single one of the switches which is in the "In" position, while all others remain unaffected by such impulse since they are disconnected. The switch which switches back gives a strong opening impulse to the respectively succeeding switch which now goes into the "In" position. This occurs despite the blocking impulse on the common control line 29 because the opening impulse is stronger than the blocking impulse on the control line and because the first becomes effective somewhat later than the latter and thus determines the end condition.

It shall be assumed that the switch 34 is at the start of the present considerations, that is, upon receipt of the first impulse from the timing channel 22—27, on the line 29, in this preference position. This impulse switches the switch 34 back into its normal position. From this switching back which consists in the changing-over from one stable position of the flip-flop switch into the other position thereof, is by differentiation obtained an impulse which places into the "In" position the mechanical switch 36, over line 35, and over line 37 the first switch 30 of the counting chain. Due to the switching over of the switch 30 which also is a flip-flop switch, there appears on line 38 a new impulse which reaches the gate 39 and, provided that such gate is open, causes switching over of the electronic switch 40. The latter gives a strong impulse to the magnetic storage core 41 which thereby becomes permanently magnetic and remains in this condition without any auxiliary measures. The second timing impulse on the line 29 switches the switch 30 back again, thereby causing the switch 31 to go into the "In" position. An impulse thereby effected in 31 reaches the gate 42. The line 43 may be assumed to carry voltage at that instant, so that the gate 42 is blocked. The switch 44 accordingly remains at normal and the storage core 45 is not energized. Further impulses reach the line 29 in regular sequence from the timing channel and all switches from 32 to the last one of the chain, switch 33, are successively switched. The respectively associated switches 46 to 47 are or are not switched, in accordance with the voltage condition of the line 43 obtaining at the respective switching instant, and the storage cores 48 to 49 accordingly are or are not made permanently magnetic.

The number of the counting switches 30 to 33 is equal to the number of perforation holes of the first symbol element sequence of the coding tape to be extended. This number is chosen so that it does not have a common divisor with any of the number of the counting switches of the other four channels. Responsive to switching-in of the last switch 33, there is extended a blocking impulse to the gate 27, by way of line 50 and the mechanical switch 51, whereby further timing impulses are kept away from the line 29.

The switch 21, as already described, is controlled by the photo diode 15 which is illuminated through the holes of the first longitudinal hole sequence of the punched tape 2 representing the first symbol element sequence. In accordance with the switching condition of 21, there will or will not be voltage on the line 43 which will or will not block the gates 39, 42, 52, etc. through to 53. The storage cores 41, 45, 48, etc. through to 49 accordingly are or are not made permanently magnetic. The permanent magnetic condition of a storage core accordingly corresponds to a hole and the non-magnetic condition corresponds to absence of a hole in the punched tape. In the storage arrangements of the 2nd, 3rd, 4th and 5th channels, there are stored in the same manner, in the storage cores thereof, the binary informations contained as holes and no-holes in the 2nd, 3rd, 4th and 5th longitudinal hole sequence (symbol element sequence) of the punched tape. The storing is terminated when the storing of the binary symbols of the hole sequence is in the storage arrangement of the channel concluded with the greatest number of counting switches. In case the described storing was not the first, so that storage cores are still permanently excited from previous storing operations, all storage cores must be demagnetized prior to each new storing operation. A key 54 is provided for this purpose, the depression of which causes a current to flow through all storage cores, the magnitude of such current being controlled by the resistor 55 and the direction of the current being such as to cause the cores to be demagnetized.

(2) *Scanning*

The switching-over of the mechanical switches 25, 36, 51 and 56 produces all connections required for the scanning of the stored symbol elements, while all connections are interrupted that were required for the storing but would disturb the scanning. The switching-over of the switch 25 above all disconnects the inputs of all channels from the timer 22—24 of the photo-electrical scanning of the punched tape and connects the channels to the impulse generator 57 as a timer, such timer controlling the channels for the scanning by way of the differentiator 58 and the switch 59. The frequency of the impulse generator 57 is very considerably higher than that of the photo-electric timer 22—24. The switch 59 is the start switch for the scanning and for the time being shall be assumed to be open. The actuated switch 36 connects the output of the electronic switch 33 by way of line 37 with the input of the switch 30 and connects the chain comprising the switches 30–33 in a ring circuit from which the switch 34 is omitted. The actuated switch 56 disconnects the minus (—) line from the storage cores 41, 45, 48, etc. to 49 and connects the minus (—) potential to the scanning ring cores 60, 61, 62, etc. to 63. The actuated switch 51 disconnects the blocking line 50 from the gate 27 which must be open during the scanning. The coding partners must prior to the start of the scanning agree as to the relative start position of the individual storers in the individual channels from which the scanning shall be started. These start positions of the individual storers are set as follows:

It has been explained in connection with the description of the storing, that the switching-in of one of the ring switches 30–33 is effected by the switching-back of the preceding one. For example, if the first channel is to start with the switching-in of its first switch 30, the switch preceding it, which is the last switch of the ring, namely, switch 33, must be positively set to the preference position. This is effected by brief actuation of the key 64 which is associated with the first switch 30 but which actuates the switch 33.

Each channel can start with any desired storage element. For example, if another channel is to start with the third storage element, that is, with the switch 32, the switch 31 preceding 32 is brought into the "In" position by the associated key 65. The switch 32 will thus be switched-in upon scanning responsive to the first timing pulse from 57. The three remaining channels are similarly brought into corresponding start positions based upon agreement between the coding partners.

The scanning starts with the actuation of the mechanical start key 59. The timing pulses of the timing generator 57 are extended by way of line 66, switch 25, line 26 and gates 27 to the control line 29. According to the assumed example, the first impulse effects in the first channel switching back of the switch 33 while switching-in the switch 30; the second impulse effects switching back of the switch 30 while switching-in the switch 31, etc., until after the switching-in and switching-out of switch 33, the switch 30 is switched-in again, when a new switching cycle is started. The switches of the switching ring are actuated with constant speed in the rhythm of the impulses delivered by the generator 57. Similar operations are effected in the remaining channels connected in parallel to the line 26, in which operations start with any other previously selected switches. Owing to the different number of storage elements of the individual channels, a mutual shifting of the storage element sequences will occur after each scanning thereof, and due to the aliquant nature of the numbers of storage elements, a given start constellation of the storage element sequences can occur only after a number of steps which is equal to the product of the storage element numbers of all five channels.

Current impulses are produced on the lines 67, 68, 69, etc. to 70, by the switching-in of the electronic switches 30, 31, 32, etc. to 33, such impulses being extended through the storage ring cores 60, 61, 62, etc. to 63. A reading line 71 is carried through all of these cores which terminates in the primary winding of the transformer 72. Current impulses induced in the line 71 by current impulses on one of the lines 67, 68, 69, etc. to 70, are conducted to the amplifier 73 by way of the transformer 72. The requirement for such operation is that the storage cores 41, 45, 48, etc. to 49, are not magnetized. If they are magnetized, the inductive transmission of the impulses will be prevented since the ring cores 60, 61, 62, etc. to 63 are disposed in the fields of the lines of force of the storage cores 41, 45, 48, etc. to 49. Moreover, two cooperatively associated cores, for example, 41 and 60 are so dimensioned that, if there is permanent magnetism of the core 41, the material of the core 60 will be over-saturated so that no inductive transmission can take place from the line 67 to the line 71. However, in the storing of the binary punched tape informations, as mentioned before, each storage core allotted to a hole in the punched tape, was permanently magnetized. Accordingly, all ring cores belonging to these storage cores, remain ineffective for the impulse transmission to the amplifier 73. However, those of the impulses which come from non-magnetized storage cores reach the bistable electronic flip-flop switch 74 by way of the amplifier 73. The switch 74, upon its switching-in places positive voltage on the line 75 which carries negative potential during the "Out" switching, while the previously positive line 76 now assumes negative potential. Shortly before termination of each timing step, the switch 74 is returned to its "Out" position by way of the line 77 which is connected with the timing generator 57.

The lines 75 and 76 are the output lines of the respective channels which extend to the electronic transverse reading devices. The transverse reading devices are operative to extract from the period of the storage system individual steps, namely, those steps in which the scanned impulse combinations coincide with any one of the previously agreed upon impulse combination set in the transverse reading devices. Incident to such "hit steps," which occur wholly irregularly, impulses are extracted from an alternating impulse sequence occurring with the same timing speed, and five such impulses occurring in succession are utilized for the building up of the impulse combinations of the extended impulse combination sequence.

FIG. 4 shows an example of a magnetic switching core having the property of retaining binary information stored therein while permitting reading out thereof as often as desired. Numeral 78 indicates a core of magnet steel carrying two windings 79 and 80. From the ends of the steel core 78 extend two soft iron yokes 81 and 82. Between the free legs of these yokes is disposed a switching core 83 made of soft magnetic and highly permeable material, for example, Mu Metal. The core 83 is provided with a central bore 84 formed therein, lines 85 and 86 extending through such bore. So long as the steel core 78 is not magnetic, a current impulse directed via the line 85 will induce a current impulse in the line 86, since the switching core 83 acts as a transformer having a primary winding represented by the line 85 and a secondary winding represented by the line 86. A brief strong current impulse directed through the winding 79 will make the steel core 78 a permanent magnet. The cross-sectional areas of the steel core 78 and the soft iron yokes 81 and 82 are large as compared with the effective cross-sectional area of the switching core 83, which has been reduced by the area occupied by the bore 84; accordingly, the highly permeable metal of the switching core 83 will be over-saturated when the steel core 78 becomes a permanent magnet. Owing to the over-saturation, the switching core 83 cannot operate as a transformer, that is, a current impulse directed via line 85 cannot induce an impulse in the line 86.

The storing of one binary information therefore requires that the steel core 78 is magnetic so that the switching core 83 can not act as a transformer. The storing of the other binary information requires that the steel core 78 is not magnetic so that the switching core 83 can operate as a transformer. The retention of the storing with reading out as often as desired is based upon the fact that the two binary conditions of the steel core 78—magnetic and non-magnetic—cannot change without auxiliary measures, and that these two conditions are not influenced by current impulses directed via the line 85.

The erasing of one binary information is effected by directing through the winding 80, for demagnetization of the steel core 78, either a current impulse of suitable strength and of a direction opposite to the direction of the imuplse employed for the magnetization, or directing therethrough an alternating current with diminishing amplitude. The erasing of the other binary information is effected by directing through the winding 79 a strong current imuplse for magnetizing the steel core 78.

The described storing cores which retain the stored information incident to reading out may be made as small as is possible with customary switching cores.

Storage ring cores that have become known under the name transfluxors exhibit similar operating properties. An example of such a ring core is shown in FIG.5. Ferrites with nearly rectangular hysteresis loop are used as material for such transfluxors.

In FIG. 5, numeral 87 designates the annular transfluxor core and numerals 88 and 89 indicate two eccentrically positioned holes with considerably different diameters. The control winding 90 extends through the larger hole 88 and the input and output or reading out lines respectively indicated at 91 and 92, extend through the smaller hole 89. The operation of the transfluxor is as follows:

A strong current impulse via the control winding 90 will magnetize the transfluxor ring core in one direction. A weaker current impulse of opposite direction, through the same winding, will magnetize the area directly about the hole 88 in opposite direction, while the more remote area about the hole 88 will retain its initial direction of magnetization owing to the lower field strength obtaining thereat. The production of this magnetic condition effects the storing.

For the purpose of reading out of the stored information, a current impulse is directed through the line 91 in one direction, whereby a current impulse is induced in the line 92. This inductive effect would not be present if the tranfluxor had not been previously placed in the described magnetic condition by the control winding 90. For the second reading out, an oppositely directed current impulse is caused to flow in line 91 so as to again induce a current impulse in the line 92 due to the flipping over of the magnetic condition in the near vicinity of the smaller hole 89. For the third reading out, a current impulse is directed through the line 91 which is of the same direction as in the first reading out, etc.

The erasing of the stored information is effected by a strong current impulse via the winding 90 which causes magnetization, in the same direction, of the near and remote areas about the hole 88.

The individual magnetic processes incident to reading out and erasing are very complicated and discussion thereof is omitted since knowledge thereof is unnecessary for the understanding of the invention.

Changes may be made within the scope and spirit of the appended claims which define what is believed to be new and desired to have protected by Letters Patent.

We claim:

1. Apparatus for producing, for use in coding machines, extended coding tapes of extremely long period, with symbol element combinations in binary code, by the use of a relatively short, aperiodic and arbitrarily selected sequence of symbol element combinations, whereby the symbol element sequences, formed respectively from the symbol elements of the symbol element combinations, exhibit numbers of symbol elements no two of which have a common divisor, wherein the binary symbol elements of the symbol element sequences are stored in storage elements which retain their binary information while permitting reading out thereof as often as desired, and wherein the stored symbol element sequences are read-out simultaneously and periodically with identical speed from any desired selectable and agreed upon relative start position, said apparatus comprising a plurality of said storage elements in number corresponding to the total number of the binary symbol elements of the symbol element sequences, said storage elements being arranged in different storage element sequences in accordance with the different symbol element sequences, means for setting the individual storers each to one of its two binary positions in accordance with the respectively associated binary symbol element, an impulse generator serving as a timer, the frequence of said impulse generator determining the speed of scanning of the storage elements, an electronic counter for each storage element sequence, said counter periodically counting the impulses of the impulse generator up to a number which is equal to the number of storage elements of the corresponding storage element sequence, an indicating device for each counter, said indicating device having a number of outputs equal to the number of the respectively available storage elements of the storage element sequence, potential alterations occurring successively impulse-wise at said outputs incident to the counting of the impulses, a setting device for each counter adapted for the setting thereof to a desired counting result within its counting period, and a plurality of read-out devices in number corresponding to the number of storage elements of each storage element sequence, each read-out device being on the input side connected with a storage element of the storage element sequence and the output belonging to said input being connected with the indicating device belonging to the storage element sequence, the outputs of said read-out device being for each storage element sequence connected each to a common output line, the impulse combinations of the extended impulse combination sequence appearing in the continuous read-out operations successively on said common output lines in the rhythm of the impulse generator.

2. Apparatus according to claim 1, wherein each storage element comprises a core made of magnet steel and provided with two windings, two yokes of soft iron material fastened to the faces of said core, a further core made of magnetic soft and highly permeable material and having a bore formed therein, said further core being disposed between the free legs of the soft iron yokes, the operatively effective cross-sectional area of said further core being small as compared with the cross-sectional areas of said steel core and said soft iron yokes, two lines constituting the read-out line and the take-off line extending through said bore, said lines constituting the primary and secondary windings of a perforated core transformer.

3. Apparatus according to claim 1, comprising transfluxors constituting magnetic storage elements.

4. Apparatus according to claim 1, comprising shift registers closed in ring circuit and constituting said electronic counters, said shift registers comprising flip-flop stages corresponding in number to the number of the storage elements of a storage element sequence which are to be read.

5. Apparatus according to claim 1, wherein said electronic counters are represented by open binary counting chains comprising serially related flip-flop stages, the number of flip-flop stages being equal to the logarithm for the fundamental 2 of the smallest power of 2 which is greater than or equal to the number of storage elements of a storage element sequence that is to be read.

References Cited in the file of this patent

UNITED STATES PATENTS 2,876,437 Johnson ---------------- Mar. 3, 1959